United States Patent
Zhang et al.

(10) Patent No.: US 8,451,563 B1
(45) Date of Patent: May 28, 2013

(54) METHOD FOR PROVIDING A SIDE SHIELD FOR A MAGNETIC RECORDING TRANSDUCER USING AN AIR BRIDGE

(75) Inventors: Jinqiu Zhang, Fremont, CA (US); Feng Liu, San Ramon, CA (US); Shaoping Li, San Ramon, CA (US); Ming Sun, Pleasanton, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 13/331,208

(22) Filed: Dec. 20, 2011

(51) Int. Cl.
*G11B 5/17* (2006.01)
*G11B 5/127* (2006.01)

(52) U.S. Cl.
USPC ................... 360/125.3; 29/603.14

(58) Field of Classification Search
USPC ............... 360/125.3, 125.02, 125.13, 125.21, 360/125.24, 125.27, 125.09, 125.04, 125.17, 360/125.12, 125.16, 125.06, 125.15, 125.26, 360/125.71; 29/603.14, 603.09, 603.08, 603.06, 29/603.16, 603.15
See application file for complete search history.

(56) References Cited

U.S. PATENT DOCUMENTS

| | | | | |
|---|---|---|---|---|
| 4,843,023 A * | 6/1989 | Chiu et al. | ............ | 438/231 |
| 5,498,898 A * | 3/1996 | Kawamura | ............ | 257/503 |
| 5,640,032 A * | 6/1997 | Tomioka | ............ | 257/316 |
| 5,672,526 A * | 9/1997 | Kawamura | ............ | 438/294 |
| 5,898,541 A * | 4/1999 | Boutaghou et al. | ........ | 360/294.4 |
| 6,297,936 B1 * | 10/2001 | Kant et al. | ........ | 360/294.4 |
| 6,489,177 B1 * | 12/2002 | Inomoto | ............ | 438/31 |
| 6,738,231 B2 * | 5/2004 | Arya et al. | ........ | 360/294.4 |
| 7,050,270 B1 * | 5/2006 | Oveyssi et al. | ........ | 360/266 |
| 7,367,112 B2 | 5/2008 | Nix et al. | | |
| 7,525,769 B2 * | 4/2009 | Yao et al. | ........ | 360/294.4 |
| 7,565,732 B2 | 7/2009 | Le et al. | | |
| 7,576,951 B2 | 8/2009 | Allen et al. | | |
| 7,684,158 B1 * | 3/2010 | Lauer | ........ | 360/294.4 |
| 7,978,438 B2 * | 7/2011 | Ohta et al. | ........ | 360/319 |
| 8,065,787 B2 * | 11/2011 | Sasaki et al. | ........ | 29/603.12 |
| 8,166,631 B1 * | 5/2012 | Tran et al. | ........ | 29/603.14 |
| 8,201,321 B2 * | 6/2012 | Matono et al. | ........ | 29/603.16 |
| 8,231,796 B1 * | 7/2012 | Li et al. | ............ | 216/22 |
| 2006/0044681 A1 | 3/2006 | Le et al. | | |
| 2006/0044682 A1 | 3/2006 | Le et al. | | |
| 2007/0115584 A1 | 5/2007 | Balamane et al. | | |
| 2007/0177301 A1 | 8/2007 | Han et al. | | |
| 2007/0223144 A1 * | 9/2007 | Yao et al. | ........ | 360/294 |
| 2008/0100959 A1 | 5/2008 | Feldbaum et al. | | |
| 2008/0110761 A1 | 5/2008 | Lam et al. | | |
| 2008/0113090 A1 | 5/2008 | Lam et al. | | |
| 2008/0278861 A1 | 11/2008 | Jiang et al. | | |
| 2009/0002885 A1 | 1/2009 | Sin | | |
| 2009/0034128 A1 * | 2/2009 | Sharma et al. | ........ | 360/294.4 |
| 2009/0116145 A1 | 5/2009 | Guan et al. | | |

(Continued)

*Primary Examiner* — Allen T Cao

(57) ABSTRACT

A method fabricates a side shield for a magnetic transducer having a nonmagnetic layer and an ABS location corresponding to an ABS. The nonmagnetic layer has a pole trench therein. The pole trench has a shape and location corresponding to the pole. A wet etchable layer is deposited. Part of the wet etchable layer resides in the pole trench. A pole is formed. The pole has a bottom and a top wider than the bottom in the pole tip region. Part of the pole in the pole tip region is in the pole trench on at least part of the wet etchable layer. At least parts of the wet etchable layer and the nonmagnetic layer are removed, forming an air bridge. The air bridge is between part of the pole at the ABS location and an underlying layer. Side shield layer(s) that substantially fill the air bridge are deposited.

14 Claims, 11 Drawing Sheets

U.S. PATENT DOCUMENTS

2009/0128952 A1 5/2009 Sato et al.
2009/0168242 A1 7/2009 Liu
2009/0184091 A1 7/2009 Zheng
2009/0195920 A1 8/2009 Bonhote et al.
2011/0228425 A1* 9/2011 Liu et al. .................... 360/244.2
2012/0304454 A1* 12/2012 Jiang et al. ................. 29/603.18

* cited by examiner

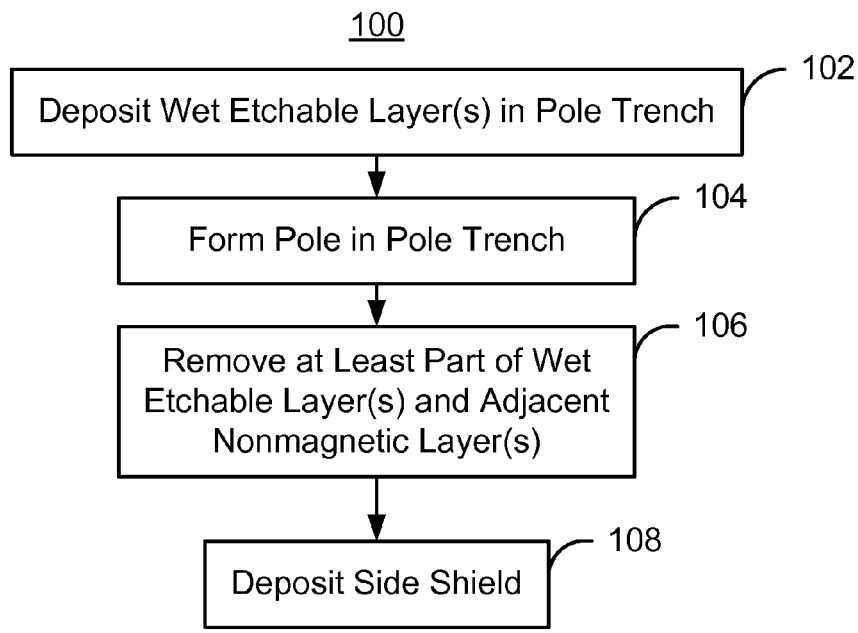
FIG. 3
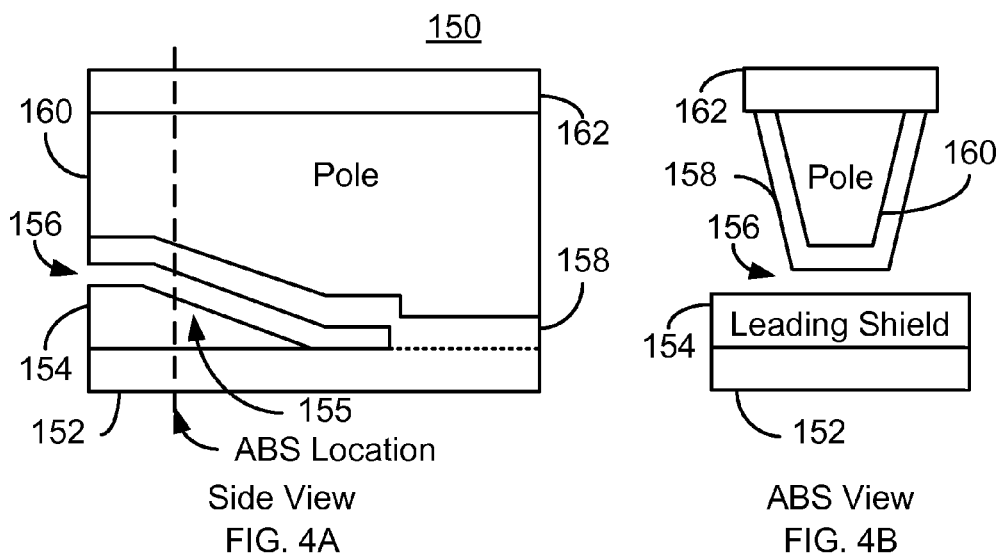
Side View
FIG. 4A
ABS View
FIG. 4B

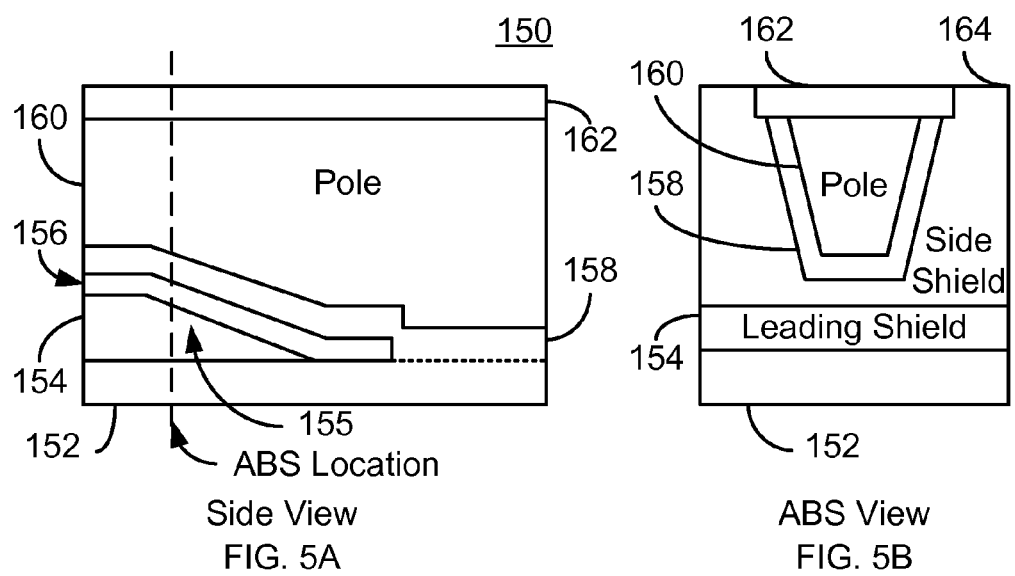

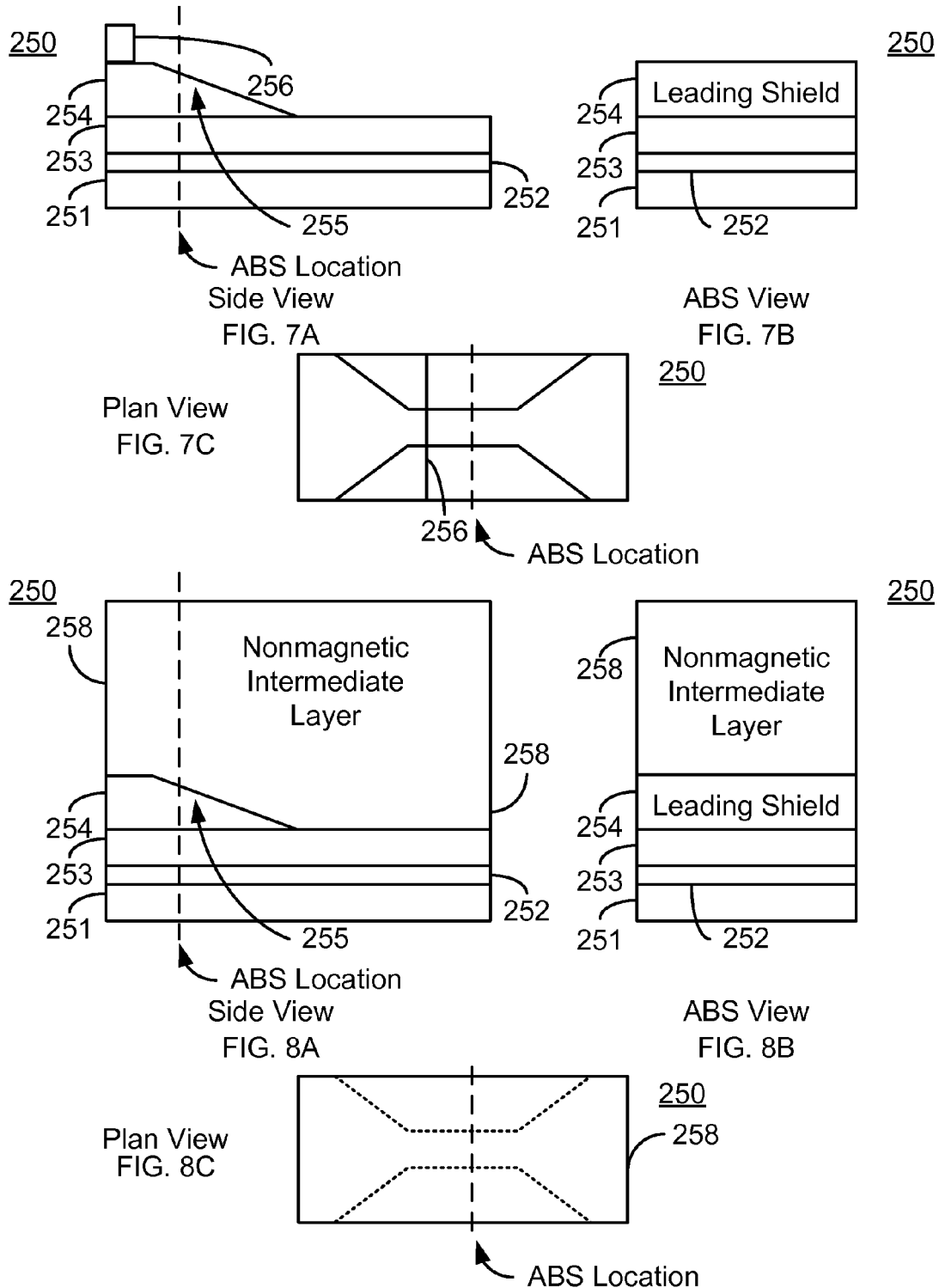

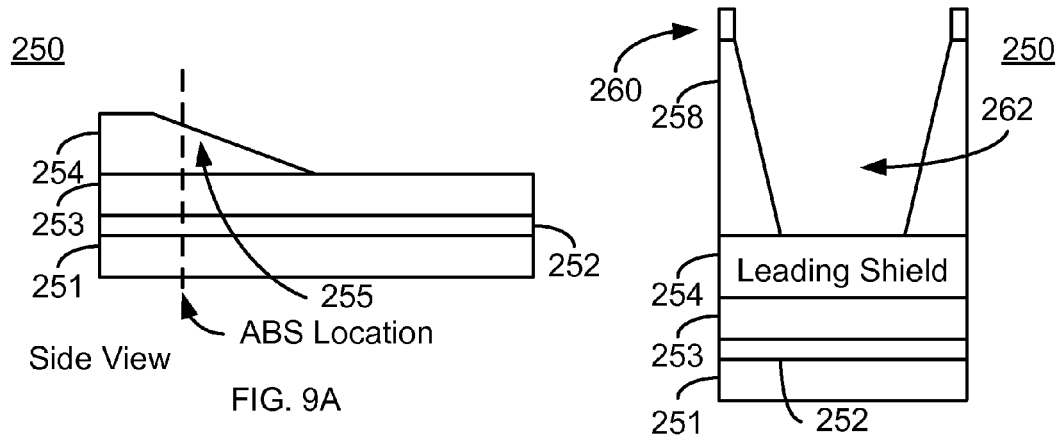
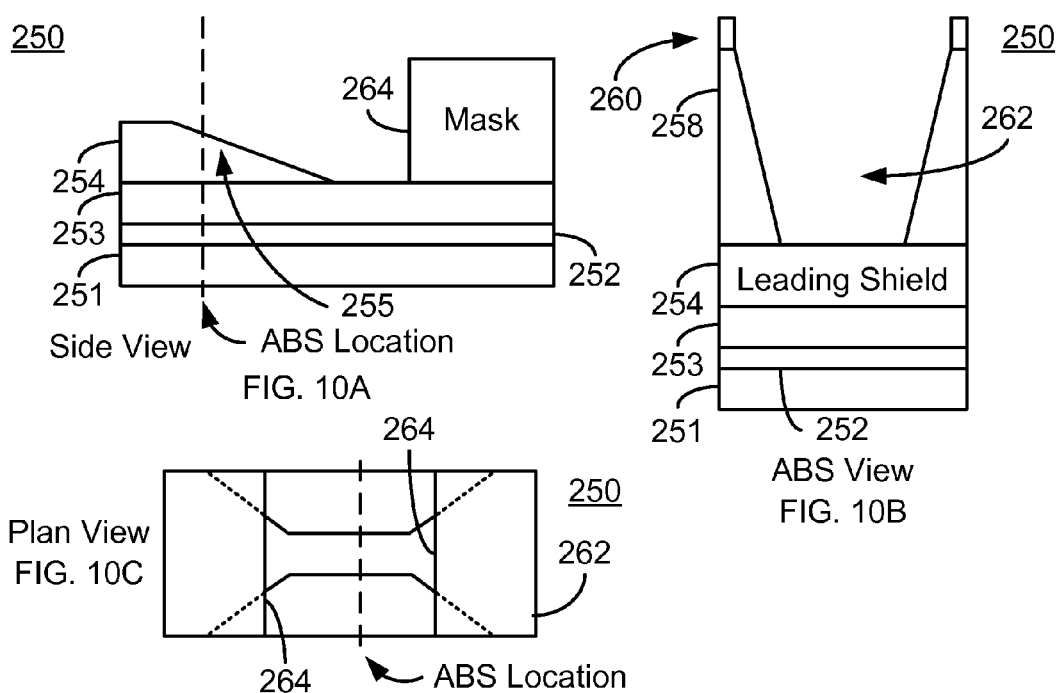

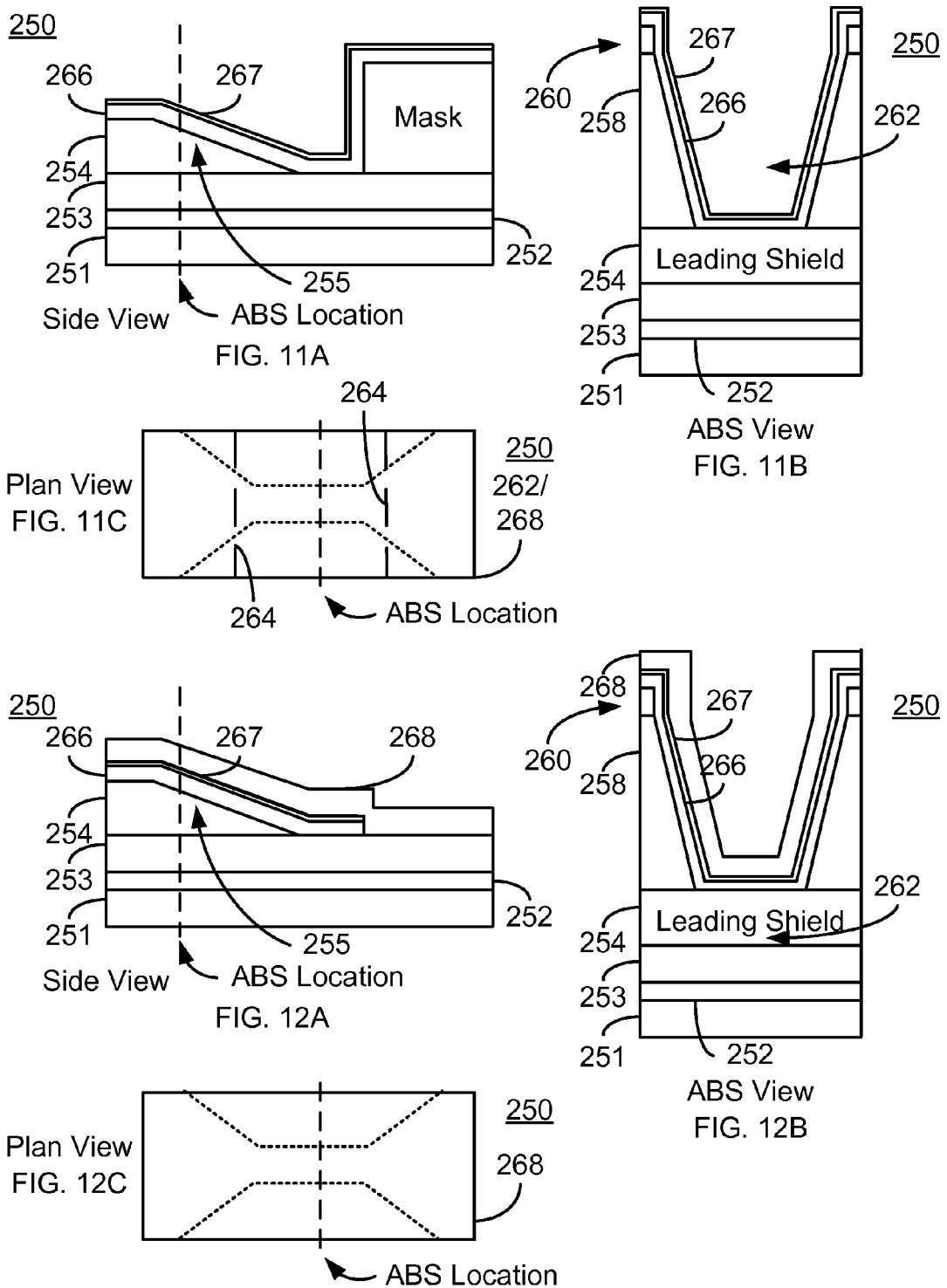

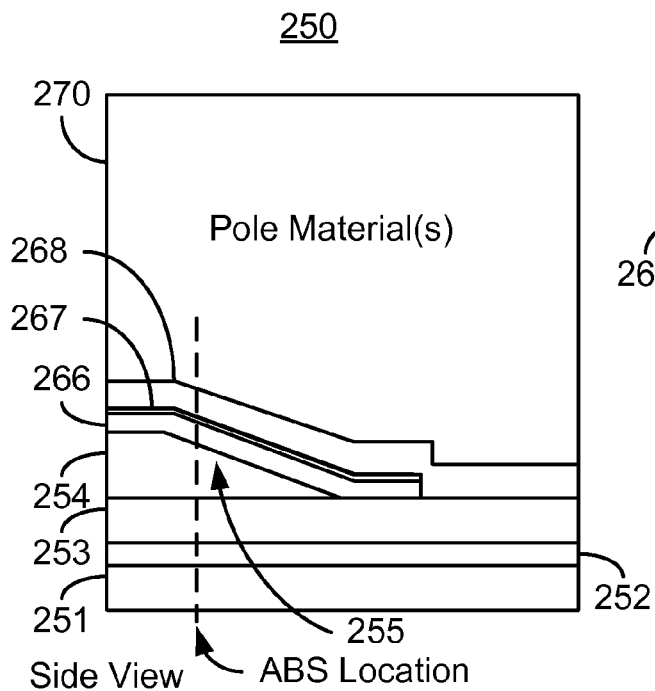
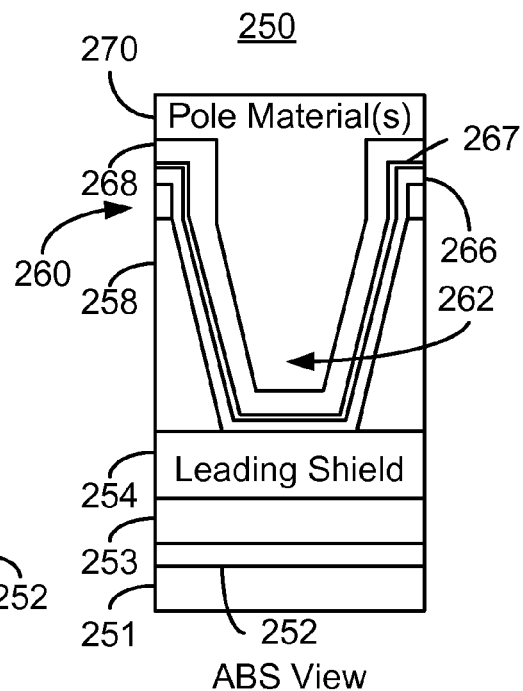
FIG. 13A    FIG. 13B
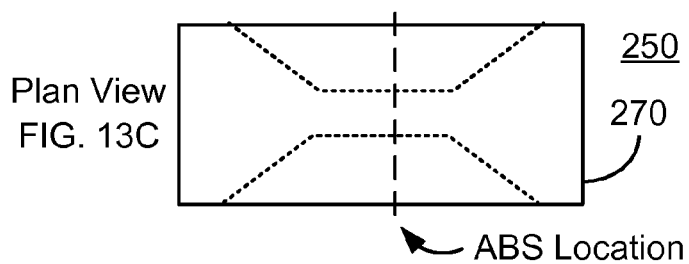
FIG. 13C

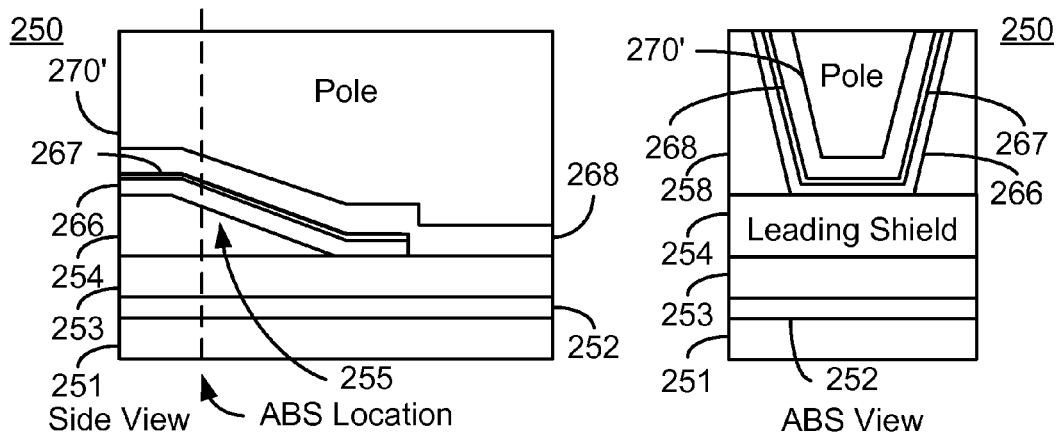
Side View
FIG. 14A
ABS View
FIG. 14B
Plan View
FIG. 14C
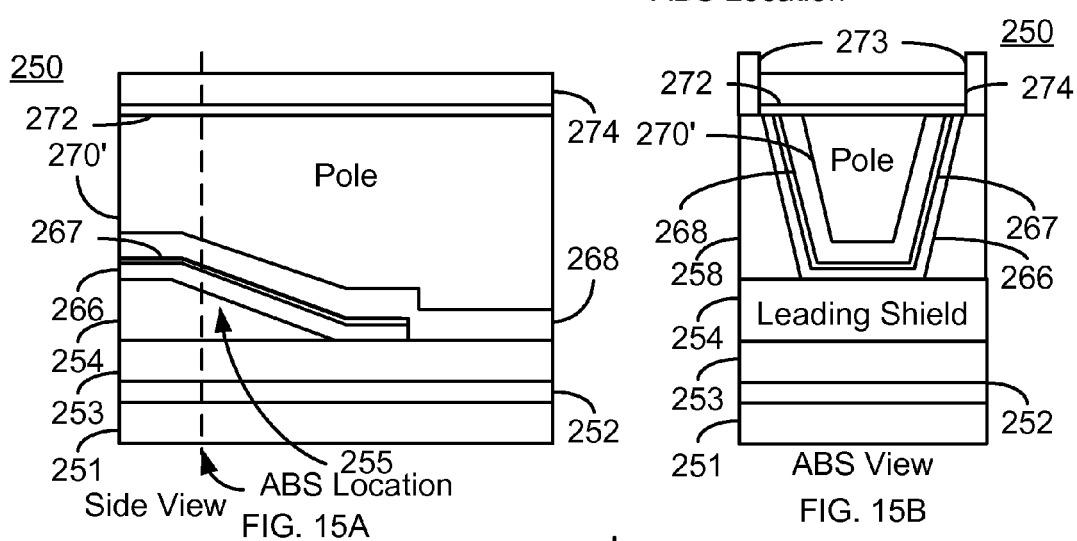
Side View
FIG. 15A
ABS View
FIG. 15B
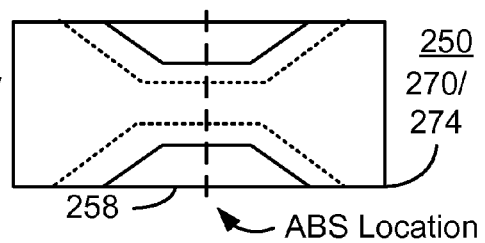
Plan View
FIG. 15C

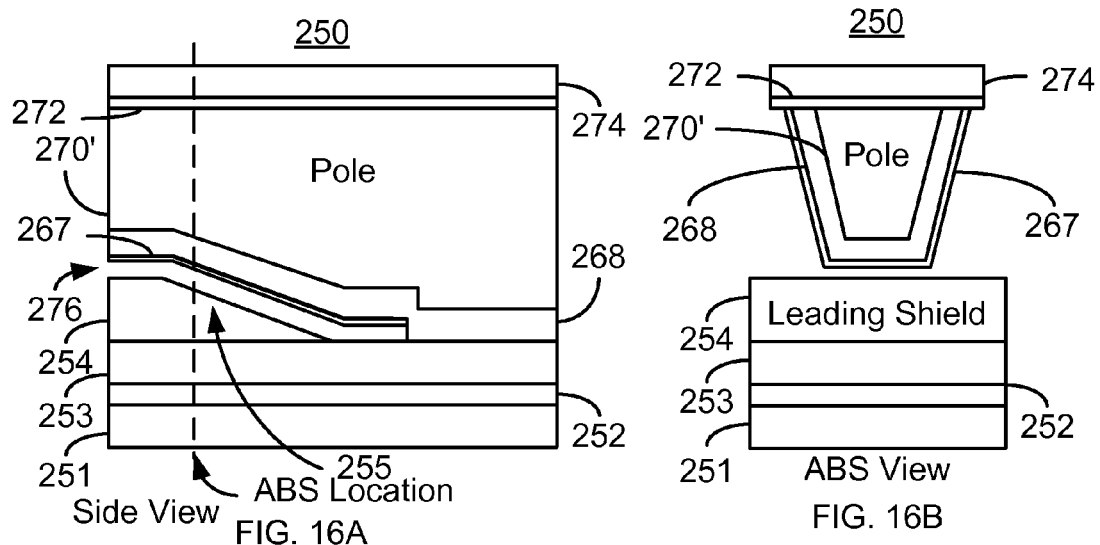
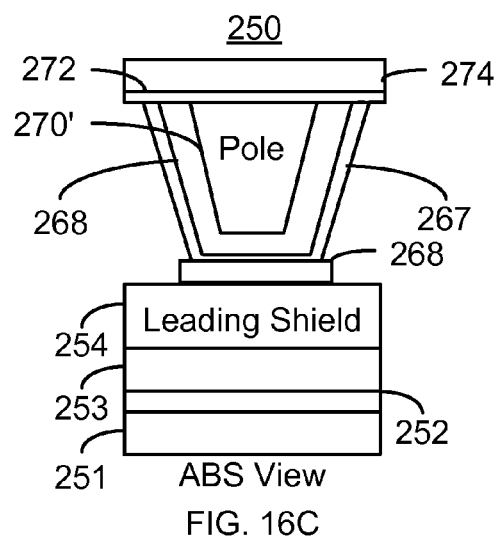
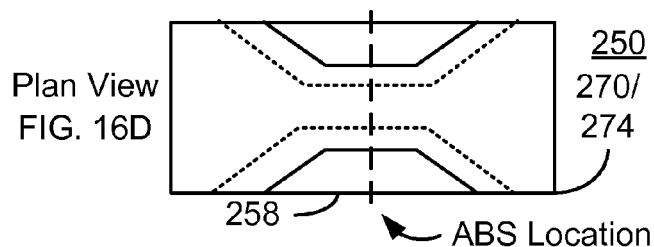

Side View

ABS View

Plan View

Side View

ABS View

METHOD FOR PROVIDING A SIDE SHIELD FOR A MAGNETIC RECORDING TRANSDUCER USING AN AIR BRIDGE

BACKGROUND

FIG. 1 is a flow chart depicting a conventional method 10 for fabricating for a conventional magnetic recording transducer including side shields. For simplicity, some steps are omitted. Prior to the conventional method 10 starting, underlayers such as a leading edge shield may be formed. The conventional method 10 typically starts by providing a pole, such as a perpendicular magnetic recording (PMR) pole, via step 12. Step 12 includes fabricating the pole in a nonmagnetic layer, such as aluminum oxide. For example, a damascene process that forms a trench in the aluminum oxide layer, deposits nonmagnetic side gap/seed layers, and deposits magnetic pole layers may be used. In addition, the portion of the magnetic material external to the trench may be removed, for example using a chemical mechanical planarization (CMP) process.

The exposed aluminum oxide is wet etched, via step 14. Thus, a trench is formed around a portion of the pole near the ABS location. Note that side gap layers may remain after the aluminum oxide etch in step 14. The removal of the aluminum oxide in step 14 exposes the top surface of the leading edge shield. The side shields are deposited, via step 16. Step 16 may include depositing seed layers and plating the side shields. Processing may then be completed, via step 18. For example, a trailing edge shield and gap may be formed.

FIG. 2 depicts plan and air-bearing surface (ABS) views of a portion of a conventional transducer 50 formed using the conventional method 10. The conventional transducer 50 includes a leading edge shield 52, side shield 54, Ru side gap layer 56 which is deposited in the trench, a pole 58, top gap layer 60, and trailing shield 62. Thus, using the conventional method 10, the pole 58, side shields 54, and trailing shield 62 may be formed.

Although the conventional method 10 may provide the conventional transducer 50, there may be drawbacks. The performance of the conventional transducer 50 may be compromised. In particular, fabrication using the method 10 may result in an interface 53 between the leading shield 52 and the side shields 54. The side shield 54 thus has corners at which field may nucleate. As a result of the side shield corner fields, the media (not shown) may undergo unexpected erasures. Further, the interface 53 may be rough, not sufficiently clean, or otherwise less than ideal due to the wet etch performed in step 14. There may also be other layers, including seed layer(s) between the leading shield 52 and the side shield 54. These additional layers may further degrade performance of the side shield 54.

Accordingly, what is needed is an improved method for fabricating a transducer.

SUMMARY

A method fabricates a side shield for a magnetic transducer. The magnetic transducer has a nonmagnetic layer and an air-bearing surface location (ABS location) corresponding to an air-bearing surface (ABS). The nonmagnetic layer has a pole trench therein. The pole trench has a shape and location corresponding to the pole. A wet etchable layer is deposited. A portion of the wet etchable layer resides in the pole trench. A pole having a pole tip region is formed. The pole has a bottom and a top wider than the bottom in the pole tip region. A portion of the pole in the pole tip region is in the pole trench on at least a first portion of the wet etchable layer. At least a second portion of the wet etchable layer and a portion of the nonmagnetic layer are removed such that an air bridge is formed. The air bridge is between the portion of the pole at the ABS location and an underlying layer. At least one side shield layer is deposited. A portion of the side shield layer(s) substantially fills the air bridge. In one aspect, the side shield layer(s) are interface-free between the pole and the underlying layer.

BRIEF DESCRIPTION OF SEVERAL VIEWS OF THE DRAWINGS

FIG. 3 is a flow chart depicting an exemplary embodiment of a method for fabricating a magnetic recording transducer including side shields.

FIGS. 4A-B are diagrams depicting an exemplary embodiment of a magnetic transducer having side shields during fabrication.

FIGS. 5A-B are diagrams depicting an exemplary embodiment of a magnetic transducer having side shields.

FIGS. 7A-C-18A-18B are diagrams depicting side, ABS, and plan views an exemplary embodiment of a magnetic recording transducer during fabrication.

DETAILED DESCRIPTION OF THE PREFERRED EMBODIMENTS

Figure 1:
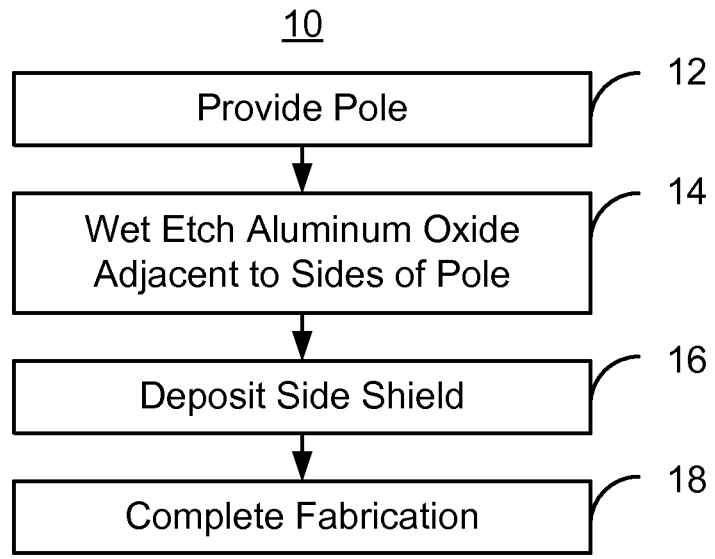
FIG. 1 is a flow chart depicting a conventional method for fabricating a magnetic recording transducer.
Figure 2:
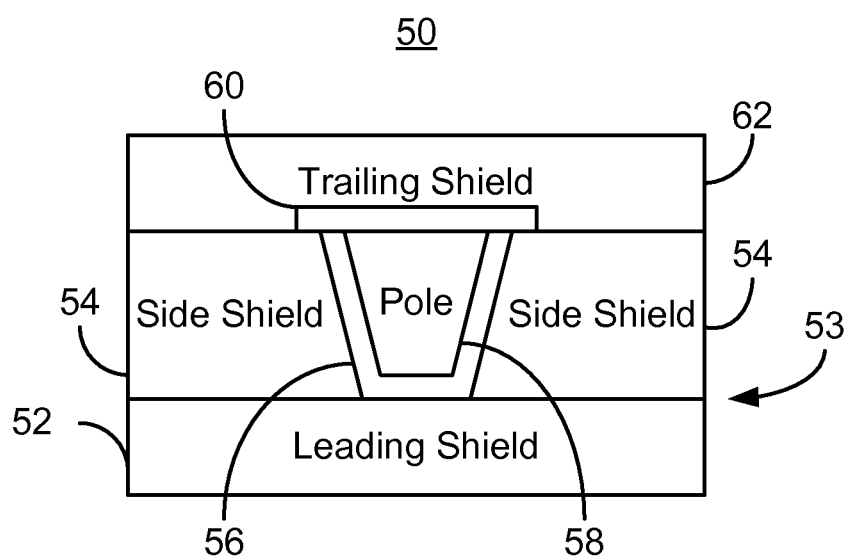
FIG. 2 is a diagram depicting an ABS view of a conventional magnetic transducer.

FIG. 3 is a flow chart depicting an exemplary embodiment of a method 100 for fabricating a transducer. The method 100 is may be used in fabricating transducers such as PMR or energy assisted magnetic recording (EAMR) transducers, though other transducers might be so fabricated. For simplicity, some steps may be omitted, performed in another order, and/or combined. The magnetic recording transducer being fabricated may be part of a merged head that also includes a read head (not shown) and resides on a slider (not shown) in a disk drive. The method 100 also may commence after formation of other portions of the PMR transducer. The method 100 is also described in the context of providing a single set of side shields and their associated structures in a single magnetic recording transducer. However, the method 100 may be used to fabricate multiple transducers at substantially the same time. The method 100 and system are also described in the context of particular layers. However, in some embodiments, such layers may include multiple sub-layers. In one embodiment, the method 100 commences after formation of the pole trench in a nonmagnetic intermediate layer. The pole trench has the shape and location of the pole to be formed. In some embodiments, the intermediate layer is an aluminum oxide layer. The nonmagnetic layer as well as the pole may reside on an underlayer. Further, in some embodiments, a leading edge shield is desired. In such embodiments, the leading edge shield may be considered part of the underlayer. The leading edge shield is generally ferromagnetic, magnetically soft, and may include materials such as NiFe. Further, an air-bearing surface location (ABS location) marks the surface at which the air-bearing surface (ABS) will reside. Finally, in some embodiments, the underlay(s) may be configured such that a bottom, or leading edge, bevel is formed.

At least one wet etchable layer is deposited after formation of the pole trench, via step 102. Thus, a portion of the wet etchable layer(s) is in the pole trench. In some embodiments, step 102 includes providing a mask that has a front edge recessed from the ABS location. The front edge corresponds to the back edge of the wet etchable layer. The back edge of the wet etchable layer may be desired to be within twenty nanometers from the back edge the side shields. Thus, the front edge of the mask may be within twenty nanometers of the desired back edge of the side shields. In some embodiments, the back edge of the wet etchable layer is desired to be aligned as closely as possible to the back edge of the side shield. Thus, the front edge of the mask may be aligned to the desired back edge of the side shields. The mask thus has an aperture that extends at least from the ABS location to the front edge of the mask. In some embodiments, in which the pole is formed with an anchor structure opposite to the pole from the ABS location, the aperture extends to a portion of the anchor structure. Once the mask is in place, the wet etchable layer is deposited. In some embodiments, the wet etchable layer is aluminum oxide. Step 102 may then include depositing the aluminum oxide layer using atomic layer deposition (ALD). In other embodiments, other materials and/or other deposition methods may be used. After the wet etchable layer has been deposited, the mask may be removed. Although described as a wet etchable layer, the layer deposited in step 102 may be removed by another method as long as the layer may be completed removed in the space between the pole (described below) and the underlying layer(s).

A pole having a pole tip region is formed, via step 104. Step 104 typically includes depositing seed and other layers as well as depositing high saturation magnetization materials for the pole. In some embodiments, step 104 includes plating the high saturation magnetization layers. Further, between steps 102 and 104 or as part of step 104, one or more wet etch stop layer(s) may be provided. In some embodiments, seed, adhesion, or other layers may be deposited as part of formation of the wet etch stop layer(s). In some embodiments, the pole has a bottom and a top wider than the bottom in the pole tip region. A portion of the pole in the pole tip region is in the pole trench and on at least a first portion of the wet etchable layer.

At least part of the wet etchable layer is removed, via step 106. In addition, a portion of the nonmagnetic layer adjacent to the sidewalls of the pole is also removed. In some embodiments, the wet etchable layer and nonmagnetic intermediate layer in which the pole trench is formed are the same material: aluminum oxide. In such embodiments, a single wet etch may remove the desired parts of both layers. However, in other embodiments, multiple wet etches including wet etches using different etch chemistries may be used. Further, other processes that are appropriate might also be used. Because some or all of the wet etchable layer is removed, an air bridge is formed between the portion of the pole in the pole tip region at the ABS location and an underlying layer, via step 106. The air bridge occupies the space under the pole in which the wet etchable layer had resided. In some embodiments, the wet etch performed in step 106 may also remove a portion of the underlying layer(s). Thus, the air bridge formed in step 106 may have a thickness of not more than one micron. In other embodiments, the air bridge may be only as thick as the wet etchable layer.

FIGS. 4A-4B depict a magnetic transducer 150 during formation using the method 100. In particular, side and ABS views are shown in FIGS. 4A and 4B, respectively. For clarity, FIGS. 4A-4B is not to scale. The magnetic transducer 150 may be part of a merged heat that includes at least one read transducer (not shown) in addition to at least one magnetic transducer 150. The magnetic transducer 150 includes an underlayer 152, and a bottom, or leading edge shield 154. In some embodiments, the leading edge shield 154 may be considered to be an underlayer. The leading edge shield 154 may also be omitted. The leading edge shield 154 is also shown as including a beveled surface 155 that corresponds to the bevel to be formed in the pole. Also shown are nonmagnetic layers 158 and 162. These layers are etch stop layers 158 and 162. Each etch stop layer 158 and 162 may include multiple sublayers. The etch stop layer 158 is shown as connecting to layer 152. In some embodiments, the layer 152 and 158 are formed of the same material, such as Ru. Thus, a dotted line is shown between the two layers 152 and 158. The pole 160 has also been formed. In the embodiment shown, the pole 160 includes a bevel corresponding to the beveled surface 155. However, in other embodiments, the pole 160 may not have a leading edge bevel. The wet etch stop layers 158 and 162 substantially surround the pole 160 in the pole tip region. Thus, the pole 160 may be protected from the etchant used in the wet etch step 106 of the method 100.

In addition, an air bridge 156 has been formed. The air bridge 156 exists between the bottom of the pole 160 and the underlying layers 152 and 154. In some embodiments, the wet etch of step 106 may also remove portions of the underlayer(s) 152 and 154. In such embodiments, the air bridge 156 may have a thickness of up to a micron. In other embodiments, the air bridge 156 may have a different thickness. Although not shown, the pole 160 may have an anchor portion (not shown in FIG. 4A) on the opposite side of the ABS location as the remainder of the pole (e.g. on the left of FIG. 4A). Thus, although shown in FIG. 4A as being supported only at the right (e.g. the yoke) region, the pole 160 may be supported on both sides of the air bridge 156. Further, the nonmagnetic layer (not shown) in proximity to the sides of the pole 160 have been removed. Thus, the pole 160 and wet etch stop layer 158 and 162 appear to be floating in the ABS view of FIG. 4B.

Referring back to FIG. 3, the material(s) for the side shield are deposited, via step 108. In some embodiments, step 108 includes depositing seed layer(s). The soft magnetic material(s) for the side shield may be plated in step 108. These materials fill the region around the pole 160. Thus, the air bridge 156 is substantially filled as is the region adjacent to the sidewalls. In some embodiments, a full wrap around shield is plated in step 108. The back of the side shields fabricated in step 108 may be within twenty nanometers of the back of the air bridge 156. Fabrication of the transducer 150 may then be completed. For example, a portion of the pole 160 near the ABS may be removed to form a trailing edge bevel. A top, or trailing edge, shield may also be formed. Other components including but not limited to coil(s), a write gap, and a top shield may be formed.

FIGS. 5A-5B depict a magnetic transducer 150 during after formation is continued using the method 100. In particular, side and ABS views are shown in FIGS. 5A and 5B, respectively. For clarity, FIGS. 5A-5B are not to scale. The magnetic transducer 150 is shown after step 110 is performed. Thus, the side shield 164 has been fabricated. As can be seen in FIG. 5B, the side shield is continuous from the one side of the pole 160, to below the pole 160 and then to the opposite side of the pole 160.

Using the method 100, side shield 164 having the desired geometry may be fabricated. More specifically, the side shield 164 is continuous. Thus, the side shield 164 may be viewed as not having corners near the pole 160. Similarly, the interface between the leading shield 154 and the side shield 164 adjacent to the pole 160 has been removed. Thus, nucleation of fields due to corners of the side shield 164 may be reduced. Further, any interface between the side shield 164 and the lead shield layer 154 may be moved further from the pole 160 and improved in quality. Thus, performance of the transducer 150 may be improved.

Figure 6:
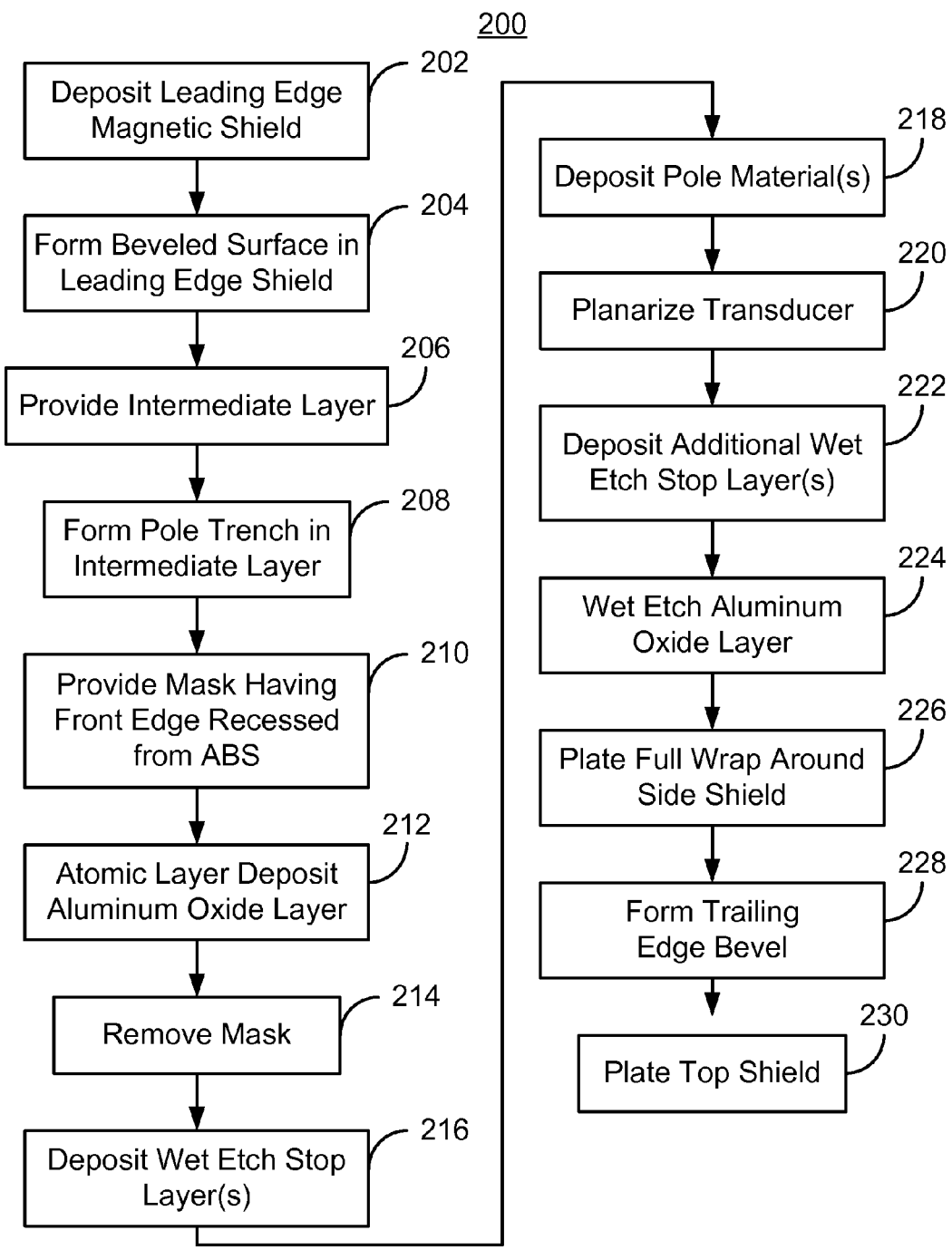
FIG. 6 is a flow chart depicting another exemplary embodiment of a method for fabricating side shields for a magnetic recording transducer.

FIG. 6 is a flow chart depicting another exemplary embodiment of a method 200 for fabricating a transducer using an air bridge. For simplicity, some steps may be omitted. FIGS. 7A-7C-FIGS. 18A-18C are diagrams depicting side, ABS location and plan views of an exemplary embodiment of a portion of a transducer during 250 fabrication. For clarity, FIGS. 7A-7C-FIGS. 18A-18C are not to scale. Although FIGS. 7A-7C-FIGS. 18A-18C depict the ABS location (location at which the ABS is to be formed) and ABS at a particular point in the pole, other embodiments may have other locations for the ABS. Referring to FIGS. 6-18C, the method 200 is described in the context of the transducer 250. However, the method 200 may be used to form another device (not shown). The transducer 250 being fabricated may be part of a merged head that also includes a read head (not shown in FIGS. 7A-7C-FIGS. 18A-18C) and resides on a slider (not shown) in a disk drive. The method 200 also may commence after formation of other portions of the transducer 250. The method 200 is also described in the context of providing a single transducer 250. However, the method 200 may be used to fabricate multiple transducers at substantially the same time. The method 200 and device 250 are also described in the context of particular layers. However, in some embodiments, such layers may include multiple sublayers.

A leading edge magnetic shield layer is deposited, via step 202. In some embodiments, step 202 includes depositing a NiFe shield layer on one or more other underlayers. In some embodiments, these underlayers include an alumina underlayer and at least one nonmagnetic layer on the alumina underlayer. In some embodiments, the nonmagnetic layer includes Ru. In some such embodiments, a Ti adhesion layer may be provided between the alumina underlayer and the leading shield layer. In embodiments in which a leading shield is omitted, step 202 may be skipped.

A beveled surface may be formed in the leading shield layer, via step 204. The beveled surface is formed by removing a portion of the leading edge magnetic shield layer distal from the ABS in step 204. Step 204 may include forming a hard mask in a region near the ABS location. In some embodiments, the hard mask resides on the leading shield layer at a location on the opposite side of the ABS location as the side at which the pole is developed. In some embodiments, the hard mask includes a trilayer of Ta/Ru/Ta that may also function as a stop layer. The hard mask may be formed by depositing the hard mask layers, forming a photoresist mask on the hard mask layers, and removing the exposed portion of the hard mask layers. The leading shield layer may then be removed to form the beveled surface, for example by ion milling at a nonzero angle from normal to the surface of the leading shield. FIGS. 7A-7C depict side, ABS and plan views of the transducer 250 after step 204 is performed. Thus, underlayers 251, 252, and 253 are shown. Also depicted is leading shield layer 254 having beveled surface 255. The hard mask 256 used is also shown.

A nonmagnetic intermediate layer having a top surface substantially perpendicular to the ABS location is provided, via step 206. In some embodiments, step 206 includes multiple substeps. For example, a nonmagnetic intermediate layer, such as aluminum oxide may be deposited. However, the deposition process may be conformal to the beveled surface 255. Thus, the top surface of the alumina may not be perpendicular to the ABS location (e.g. flat). A planarization such as a CMP may then be carried out and the hard mask 156 removed. Thus, the top surface of the intermediate layer and the leading shield layer 254 may be aligned. Another aluminum oxide layer may then be deposited. The two aluminum oxide layers may be considered to form a single, nonmagnetic intermediate layer. FIGS. 8A-8C depict side, ABS location, and plan views of the transducer 250 after step 206 is completed. Thus, intermediate layer 258 is shown. In some embodiments, the layer 25*i* is alumina and includes sublayers (not separately shown).

A pole trench is formed in the intermediate layer 258, via step 208. Step 208 may include depositing hard mask layer(s) and providing a photoresist mask on the hard mask layers. The photoresist mask includes an aperture having a location and width corresponding to the desired trench. The underlying hard mask may then be etched, forming an aperture in the hard mask. The intermediate layer may then be etched in the region under the aperture in the hard mask. Thus, a pole trench having a bottom, a top wider than the bottom, and a location corresponding to a pole is formed. A portion of the bottom of the pole trench in a pole tip region proximate to the ABS location being formed by the beveled surface of the leading edge magnetic shield layer. FIGS. 9A-9C depict the transducer after step 210 is performed. Thus, trench 262 is shown.

A mask having a front edge and covering a portion of the pole trench distal from the ABS location is provided, via step 210. The front edge of the mask is not more than 20 nm from a desired back edge of a full wrap around shield. FIGS. 10A-10C depict the transducer 250 after step 210 is performed. Thus, mask 264 is shown. The mask 264 covers a portion of the trench 262.

At least one wet etchable layer is deposited, via step 212. Step 212 may include depositing an aluminum oxide layer. In some embodiments, step 212 is performed using ALD. In some embodiments, step 212 includes deposition of a an adhesion layer. FIGS. 11A-11C depict side, ABS, and plan views of the transducer 250 after step 212 is performed. Thus, alumina layer 266 is shown. In some embodiments, a portion of the aluminum oxide layer 266 in the pole trench. Also shown is Ti adhesion layer 267 that may also be deposited. In other embodiments, Ti layer 267 may be omitted. Note that the location of the trench 262 is shown by a dotted line in FIG. 11C.

The mask 264 is removed, via step 214. At least one wet etch stop layer is also deposited, via step 216. In some embodiments, step 216 includes performing a CVD Ru deposition. FIGS. 12A-12C depict the transducer 250 after step 214 is performed. Thus, Ru layer 268 has been formed.

At least one pole material is deposited on the at least one wet etch stop layer, via step 218. The trench 264 is thus filled. FIGS. 13A-13C depicts side, ABS, and plan views of the transducer after step 218 is performed. Thus, material(s) 270 for the pole are shown.

The transducer is planarized, via step 220. Thus, a portion of the pole material(s) 270 shown is removed. FIGS. 14A-14C depicts side, ABS, and plan views of the transducer 250 after step 220 is performed. Thus, portions of the pole material 270 external to the trench are removed and a pole 270' is formed. The pole 270' has a plurality of sidewalls, a pole bottom, a pole top, and a pole tip portion. A portion of the pole 270' also resides in the pole tip region of the pole trench. The pole tip portion of the pole 270' residing on at least a first portion of the Ru etch stop layer 268. As can be seen in FIG. 14B, the pole top is wider than the pole bottom in at least the pole tip portion.

At least an additional wet etch stop layer is deposited, via step 222. In some embodiments, step 222 includes providing a mask having an aperture over the pole and then depositing the wet etch stop layer(s). FIGS. 15A-15C depict side, ABS, can plan views of the transducer 250 after step 222 is performed. In the embodiment shown, two layers 272 and 274 are shown. These layers 272 and 274 cover the top of the pole 270' and a portion of the wet etch stop layer 268 in the pole tip region. In the embodiment shown, a Ti adhesion layer 272 is also shown. However, in other embodiments, other materials may be used or the layer 272 may be omitted. Also shown is mask 273 that may be used in forming the additional wet etch layer 274. As can be seen in FIG. 15B, a combination of the wet etch stop layer(s) 268 and 274 substantially surround the sidewalls, the bottom, and the pole top in the pole tip region.

The aluminum oxide layer 266 and a second portion of the intermediate layer 258 are wet etched, via step 224. Thus, an air bridge is formed. FIGS. 16A-16D depict side, ABS, yoke, and plan views of the transducer 250 after step 224 is performed. An air bridge 276 is shown. The air bridge 276 is between at least the leading edge magnetic shield layer 254 and the wet etch stop layer 268 on which bottom of the pole tip portion of the pole 270' resides. Note, however, that the air bridge 276 extends only under a portion of the pole 270'. This may best be seen in FIG. 16A (side view) and a comparison of FIG. 16B (ABS view) and 16C (view closer to the yoke).

Figure 17A:
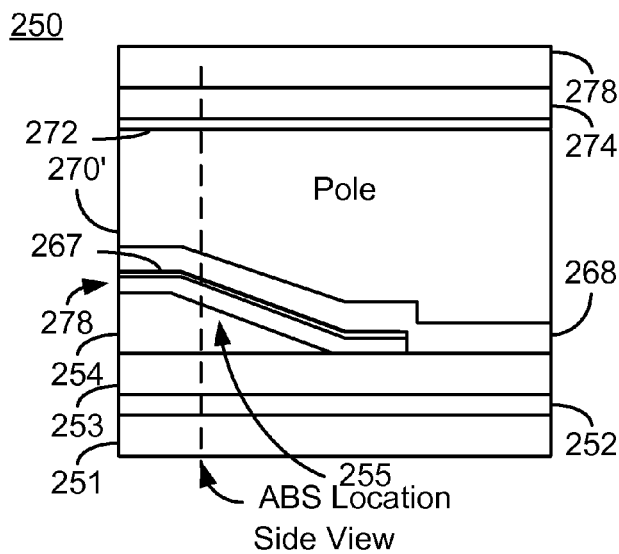
Figure 17B:
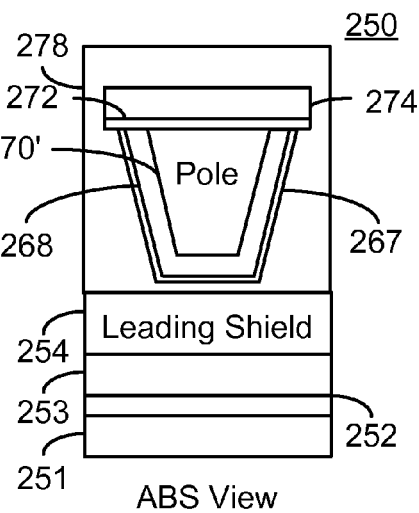
Figure 17C:
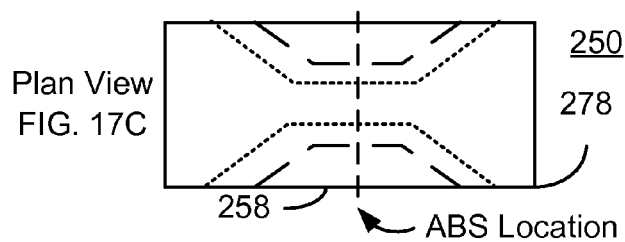
Figure 18A:
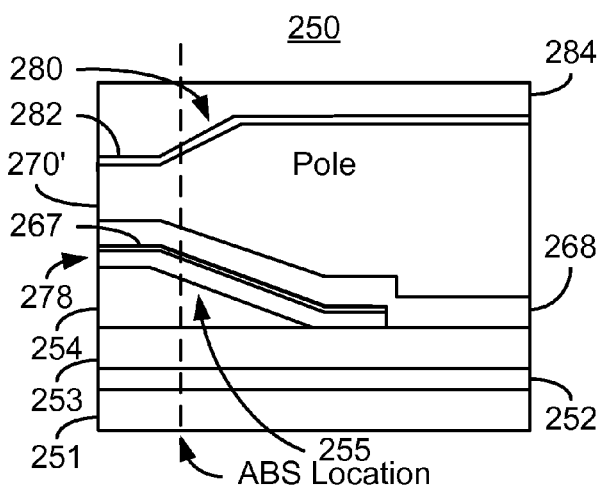
Figure 18B:
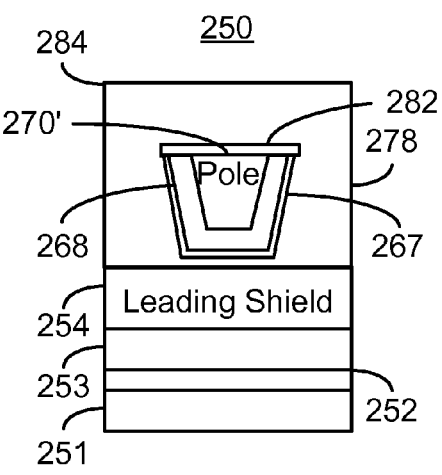

A full wrap around side shield is plated, via step 226. FIGS. 17A-17C depicts side, ABS, and plan views of the transducer after step 26 is performed. Thus, a wraparound side shield 278 is shown. A portion of the full wrap around side shield 275 substantially fills the air bridge. In some embodiments, a trailing edge bevel may be formed, via step 228. Step 228 may include performing a planarization such as a CMP and removing a portion of the pole 260'. This removal may be accomplished by providing a mask covering a portion of the pole 270' distal from the ABS location and performing an ion mill. A top shield may then be plated, via step 230. FIGS. 18A-18B depict side and ABS views of the transducer 250 after step 230 is performed. Thus, a trailing edge bevel 280, gap layer 282 and top shield 284 are shown.

Thus, using the method 200, the transducer 250 may be fabricated. The transducer 250 shares the benefits of the transducer 150. A side shield 278 that is continuous and interface free below the pole 278 may be formed. Thus, performance of the transducer 250 may be improved.

We claim:

1. A method for fabricating a side shield for a magnetic transducer having a nonmagnetic layer and an air-bearing surface location (ABS location) corresponding to an air-bearing surface (ABS), the nonmagnetic layer having a pole trench therein, the pole trench having a shape and location corresponding to the pole, the method comprising:
    depositing a wet etchable layer, a portion of the wet etchable layer residing in the pole trench;
    forming a pole having a pole tip region, the pole having a bottom and a top wider than the bottom in the pole tip region, a portion of the pole in the pole tip region residing in the pole trench on at least a first portion of the wet etchable layer;
    removing at least a second portion of the wet etchable layer and a portion of the nonmagnetic layer such that an air bridge resides between the portion of the pole at the ABS location and an underlying layer; and
    depositing at least one side shield layer, a portion of the at least one side shield layer substantially filling the air bridge.

2. The method of claim 1 wherein the intermediate layer resides the on at least one underlayer, the method further comprising:
    removing a portion of the at least one underlayer before the intermediate layer is provided such that a bottom of the pole trench proximate to the ABS location includes a beveled surface and a leading edge bevel is formed in the pole.

3. The method of claim 2 wherein a portion of the at least one underlayer at the ABS location is a leading edge shield.

4. The method of claim 1 wherein the step of forming the pole further includes:
    depositing a wet etch stop layer on the wet etchable layer; and
    depositing at least one pole material on the wet etch stop layer.

5. The method of claim 4 wherein the pole has a plurality of sidewalls, the method further comprising:
    depositing an additional wet etch stop layer on the pole, the wet etch stop layer and the additional wet etch stop layer substantially surrounding the plurality of sidewalls, the bottom, and the top of the pole in the pole tip region proximate to the ABS location before the step of removing the second portion of the wet etchable layer.

6. The method of claim 1 wherein the step of depositing the wet etchable layer further includes:
    atomic layer depositing the wet etchable layer.

7. The method of claim 1 wherein the step of providing the at least one side shield further includes:
    plating a full wrap around shield.

8. The method of claim 7 wherein the full wrap around shield has a back edge recessed a first distance from the ABS and wherein the air bridge has an air bridge back surface recessed a second distance from the ABS, the second distance being not more than twenty nanometers different from the first distance.

9. The method of claim 1 wherein the air bridge had a thickness of not more than one micron.

10. The method of claim 1 further comprising:
    removing at least a portion of the pole, forming a trailing edge bevel.

11. The method of claim 1 further comprising:
    providing a mask having a front edge and covering a portion of the pole trench distal from the ABS location, the front edge being not more than 20 nm from a desired back edge of the at least one side shield before the step of depositing the wet etchable layer; and
    removing the mask after the step of depositing the wet etchable layer.

12. A method for fabricating a side shield for a magnetic transducer having a nonmagnetic layer and an air-bearing surface location (ABS location) corresponding to an air-bearing surface (ABS), the method comprising:
    depositing a leading edge magnetic shield layer;
    removing a portion of the leading edge magnetic shield layer distal from the ABS, forming a first beveled surface on the leading edge magnetic shield layer;
    providing an intermediate layer having a top surface substantially perpendicular to the ABS location;
    removing a first portion of the intermediate layer forming a pole trench therein, the pole trench having a bottom, a top wider than the bottom, and a location corresponding to a pole, a portion of the bottom of the pole trench in a pole tip region proximate to the ABS location being formed by the beveled surface of the leading edge magnetic shield layer;
    providing a mask having a front edge and covering a portion of the pole trench distal from the ABS location, the front edge being not more than 20 nm from a desired back edge of a full wrap around shield;

atomic layer depositing an aluminum oxide layer, a portion of the aluminum oxide layer residing in the pole trench;

removing the mask;

depositing at least one wet etch stop layer, a portion of the at least one wet etch stop layer residing in the pole trench and covering the aluminum oxide layer;

depositing at least one pole material on the at least one wet etch stop layer;

planarizing the transducer, thereby removing a portion of the at least one pole material and forming the pole having a plurality of sidewalls, a pole bottom, a pole top, and a pole tip portion residing in the pole tip region of the pole trench, the pole tip portion of the pole residing on at least a first portion of the Ru layer, the pole top being wider than the pole bottom in at least the pole tip portion, the bottom of the pole capable of including a leading edge bevel corresponding to the beveled surface;

depositing at least an additional wet etch stop layer covering the top of the pole and a portion of the at least one wet etch stop layer in the pole tip region such that a combination of the at least one wet etch stop layer and the at least one additional wet etch stop layer substantially surround the plurality of sidewalls, the pole bottom, and the pole top in the pole tip region;

wet etching the aluminum oxide layer and a second portion of the intermediate layer such that an air bridge resides between at least the leading edge magnetic shield layer and the first portion of the at least one wet etch stop layer on which bottom of the pole tip portion of the pole resides; and plating the full wrap around side shield, a portion of the full wrap around side shield substantially filling the air bridge.

13. The method of claim 12 further comprising:

removing at least a portion of the pole, forming a trailing edge bevel.

14. The method of claim 12 further comprising:

plating a top shield.

* * * * *